United States Patent [19]

d'Alayer de Costemore d'Arc

[11] 4,357,643
[45] Nov. 2, 1982

[54] METHOD AND APPARATUS FOR CORRECTING AUTOMATICALLY THE DESIGNATION OF TYPE OF TAPE CARRIER

[75] Inventor: Stephane M. d'Alayer de Costemore d'Arc, Brussels, Belgium

[73] Assignee: Staar S.A., Belgium

[21] Appl. No.: 105,980

[22] Filed: Dec. 21, 1979

[30] Foreign Application Priority Data

Dec. 27, 1978 [BE] Belgium .................. 873073

[51] Int. Cl.³ ............................................. G11B 27/36
[52] U.S. Cl. ................................ 360/137; 360/72.3;
   360/31; 369/58; 318/7; 242/75.51; 242/191
[58] Field of Search ............ 360/94, 72.3, 74.2,
   360/96.3, 137, 71, 31; 340/675; 318/7; 242/191,
   186, 75.51; 369/58, 53

[56] References Cited

U.S. PATENT DOCUMENTS

| | | | |
|---|---|---|---|
| 3,564,219 | 2/1971 | Mutziger | 242/191 |
| 3,820,101 | 6/1974 | Bolick | 340/675 |
| 3,834,648 | 9/1974 | Rose | 242/191 |
| 3,849,661 | 11/1974 | Beiter | 242/191 |
| 4,001,552 | 1/1977 | Miller | 242/191 |
| 4,125,881 | 11/1978 | Eige | 318/7 |
| 4,172,231 | 10/1979 | d'Alayer de Costemore d'Arc et al. | 242/191 |
| 4,206,483 | 6/1980 | Nakamura | 360/137 |
| 4,232,371 | 11/1980 | Kamoto | 242/186 |

*Primary Examiner*—John H. Wolff
*Assistant Examiner*—Alan Faber
*Attorney, Agent, or Firm*—Leydig, Voit, Osann, Mayer and Holt, Ltd.

[57] ABSTRACT

Method and apparatus for determining automatically the type of tape carrier introduced into a device designed for transferring a tape between two reels. Two positions of the tape are compared and a signal is generated which is representative of this comparison. The comparison signal is compared with an interval or a reference value and as a result of this latter comparison, the indication of the type of tape carrier is either corrected or not corrected.

21 Claims, 11 Drawing Figures

METHOD AND APPARATUS FOR CORRECTING AUTOMATICALLY THE DESIGNATION OF TYPE OF TAPE CARRIER

DESCRIPTION OF THE INVENTION

The present invention relates to improvements in methods and apparatus for indicating the position of a flexible web being transferred from one reel to a second reel in a web/reel assembly, and more particularly concerns tape transport apparatus for tape cassettes and the determination of whether or not the type of cassette selected or indicated is correct so that valid position information may be provided for the tape.

In U.S. Pat. No. 4,172,231, commonly assigned with the present application, a method and apparatus is illustrated which provides precise indications of the position of a tape during its transfer from a supply reel to a take up reel. This U.S. Pat. No. 4,172,231, issued Oct. 23, 1979, and entitled TRANSFER OF A FLEXIBLE WEB MEMBER FROM SUPPLY REEL TO A TAKE-UP REEL is hereby specifically incorporated herein by reference.

According to the teachings of the above mentioned patent, the rotational speeds of a supply reel and a take up reel are measured, and the ratio between these measurements is established independently of the speed and the direction of movement of the tape. Reference data representing the characteristics of different types of reels and tapes, such as specific cassette type identifications, are stored in the device, and the reference data corresponding to the reels and tape in use are utilized in calculations. Intermediate signals representing the ratio between the rotational speeds of the supply reel and the take up reel are generated, and with the aid of these intermediate signals and of the reference data, output signals are produced as a function of the instantaneous position of the tape with respect to one and/or the other of one of its ends. The output signals are used for indicating the position of the tape and/or for controlling certain operations of the tape device.

As explained in U.S. patent application Ser. No. 953,211, filed Oct. 20, 1978, and commonly assigned with the present application, the manual selection of constants corresponding to the type of cassette used involves the danger of a user selecting the wrong cassette type. This may lead to faulty indication of tape position, and at high speeds premature slowing down with unnecessary increase in winding and unwinding times, or even no slowing down at the end of the tape with consequent danger of tape breakage and so on. In the above mentioned application, a simple and reliable method is proposed for identifying automatically the type of cassette introduced into the device, but which method is put into operation only when the user presses the corresponding control button. If, therefore, the user of the device does not select the feature of automatic identification of the type of cassette used, the above mentioned dangers of erroneous cassette type selection are not eliminated.

The invention of the aforesaid U.S. Pat. No. 4,172,231 is described therein as useful in transport apparatus for reel/web assemblies the physical parameters of which are known, the physical parameters including the tape length and thickness, and the reel hub diameters. In such a transport apparatus operating with a web/reel assembly having known physical parameters, the position relative to one end of the web of an intermediate portion being transferred from one reel to the other, may be determined by a computational process using mathematical equations, i.e. by following tape position determination algorithms employing constants established by the known physical parameters of that reel/web assembly, and a variable parameter; namely, the ratio of rotational speeds of the two reels as the intermediate web portion is being transferred from one reel to the other, which ratio continuously changes as the web is transferred. It is explained in said prior patent that the same algorithms employing the same constants may be followed to determine the position of an intermediate web portion at any stage of transfer of the web; the only input required at any stage is the ratio of the rotational speeds of the reels. By determining tape position in a regularly repeating cycle, using said tape position determination algorithms, and producing each cycle an output signal representing the position determined for the web during that cycle, the output signals may be utilized to monitor the transfer of the web in the apparatus, for example, by displaying the continuously changing position of the web or controlling the operation of the transport apparatus.

The method of said prior patent is particularly, although not exclusively, useful in tape transport apparatus for cassettes of tape which are a standard type for example, cassettes providing sixty, ninety and one hundred twenty minutes of playing time known, respectively, as C-60, C-90 and C-120 cassettes. Such cassettes are conventional with two reels and different known lengths and thickness of tape to provide the various lengths of playing time. The method entails first establishing constants for each tape cassette, which constants are used in the position determination algorithms, and storing a set of constants for each tape cassette in, for example, a semiconductor memory unit. In tape transport apparatus under the control of a microprocessor, signals representing the set of constants corresponding to the cassette loaded into the transport apparatus, are recalled from the memory unit, intermediate signals are generated representing the ratio $P_1/P_2$ measuring the rotational speeds of the reels, and by circuit means such as the microprocessor under program control a determination is made of tape position in terms of the length ($l_1$ or $l_2$) or time ($t_1$ or $t_2$) to the end of the web on either reel of an intermediate portion of the web being transferred from one reel to the other, using position determination algorithms employing the following equations:

$$l_1 = \frac{A}{1 + \left(\frac{P_1}{P_2}\right)^2} - B \qquad \text{Equation (I)}$$

(take-up reel)

$$l_2 = \frac{A}{\left(\frac{P_2}{P_1}\right)^2} - B \qquad \text{Equation (I)}'$$

(supply reel)

wherein $A = L \cdot \frac{T^2 + 1}{T^2 - 1}$ and $B = L \cdot \frac{1}{T^2 - 1}$;

L representing the total length of magnetic tape, $l_1$ representing the used tape, $l_2$, the remaining tape, T representing the ratio P1/P2 when $L=l_2$ i.e. at the beginning of the tape. T is thus a constant which characterizes each type of cassette and which can be determined either mathematically or by experiment.

If the two terms of the Equation (I) and (I)' are divided by L, we obtain the following:

With $\frac{A}{L} = A' = \frac{T^2 + 1}{T^2 - 1}$ and $\frac{B}{L} = B' = \frac{1}{T^2 - 1}$:

$$\frac{l_1}{L} = \frac{A'}{1 + \left(\frac{P_1}{P_2}\right)^2} - B' \text{ and} \qquad \text{Equation (II)}$$

$$\frac{l_2}{L} = \frac{A'}{1 + \left(\frac{P_2}{P_1}\right)^2} - B' \qquad \text{Equation (II)'}$$

It is also possible to multiply the two terms of quation II and II' by the duration $\tau$ of the cassette, of which the usual types may have the values defined above. We then obtain, with $$A'' = A' \times \tau \text{ and } B'' = B' \times \tau$$

the following:

$$t_1 = \frac{A''}{1 + \left(\frac{P_1}{P_2}\right)^2} - B'' \qquad \text{Equation (III)}$$

$$t_2 = \frac{A''}{1 + \left(\frac{P_2}{P_1}\right)^2} - B'' \qquad \text{Equation (III)'}$$

Among the other Equations, (I) and (I)' represent the length of the magnetic tape wound on the take-up reel and on the supply reel respectively, i.e. a position determination in terms of linear dimension. Equations (II) and (II)' represent the ratios of the length of the magnetic tape wound on the take-up reel and on the supply reel respectively to its total length, i.e. a position indication in non-dimensional terms, while Equations (III) and (III)' represent the time taken by the magnetic tape to reach the radius $R_1$ on the take-up reel and the radius $R_2$ on the supply reel respectively, i.e. a position indication in terms of time, representing the playback time or recording time which has elapsed since the beginning of the magnetic tape or which remains until the end of the magnetic tape respectively.

The sets of constants, A, A', A'', and B, B', B'' for the different types of cassettes are determined statistically, so that account can be taken, with sufficient accuracy, of the very slight variations which may exist between different cassettes of one and the same type and which result, for example, from production tolerances. Constants for the C-120 tape cassette have been minimized as $A''=72.2496$ and $B''=5.9961$, as an example of constants for use in web position determination using Equation III'.

According to the method disclosed in said prior U.S. Pat. No. 4,172,231, the rotational speeds of the reels are represented by pulse streams from pulse generators driven responsive to rotation of each reel. Pulses at the rate of twenty per revolution of each reel are fed to shift registers which accumulate the pulses and reel speed ratios are calculated based on the total number of pulses accumulated in the registers. It was recognized that the accumulated total of pulses in a shift register provided only an approximate representation of the instantaneous rotational speed of one of the reels.

According to the application Ser. No. 953,211, instantaneous reel speed ratios are calculated based on the real time for each reel to make two revolutions when driven at normal (play or record) speed, and four revolutions when driven at fast (forward o rewind) speed. In that case, pulse generators on the reel spindles produce eight pulses (hereinafter called "reel pulses") each revolution of the reel, which pulses are counted. Clock pulses generated at a rate determined by an internal clock, illustratively 4 KHz, are clocked into and accumulated in a timing register for each reel for the time period elapsed until either 16 or 32 reel pulses are counted, the content of each of the timing registers the representing the real time for two or four revolutions of each of the reels; instantaneous reel speed ratios are calculated by dividing the contents of the timing registers.

Further, according to the above-mentioned application, an unknown web/reel assembly or cassette is identified by first recalling from memory predetermined values of constants, which are called I.D. constants, and then proceeding through a cassette identifying process in which a first tape position determination is made based on the recalled numerical constants, the tape is moved a prescribed distance, a second tape position determination is made, the actual prescribed distance is compared with the theoretical distance between the first and second determined positions and in accordance with that comparison, the unknown cassette is determined to be one of the known types, and thus the unknown cassette is identified. In carrying out the I.D. mode of operation preferably the two positions are determined by operation of a miroprocessor under program control using position determination algorithms including one of the equations (I) to (III)' referred to above for computing tape positions employing numerical constants derived from the I.D. constants store, and reel speed ratio is measured as the tape is transferred from reel to reel. The two predetermined positions can be selected in arbitrary manner, and may in particular be fixed by predetermined numbers of revolutions of the reels or pulses supplied by the rotational speed detector or detectors (pulse generators) of one and/or the other of the reels. The process is thus based on measuring the rotational velocity of each of the reels, which velocity is dependent on their characteristics, their state of winding, and the type of tape used.

This method for automatically identifying an unknown cassette as one of a plurality of known types, is implemented in tape transport apparatus operated under the control of a controller that includes a central processor unit (CPU) and associated memory units (ROM) for programs and storage of numerical constants representing the cassettes, and the cassette I.D. constants. Tape transport apparatus including reel drive motors and motor control circuits therefor, is controlled by the microprocessor type controller to perform the I.D. mode of operation in which the tape is moved from a starting position at normal speed for the first tape position determination, at fast speed to the second position, at normal speed for the second tape position determination, and after the cassette is identified, the tape is returned to the starting position. The microprocessor under program control provides means for determining the first and second tape positions, means for calculating the theoretical difference between the first and second positions, means for measuring the actual difference between the same positions, means for comparing the theoretical and actual differences and in accordance with the comparison confirming that the unknown cassette is of one or of another known type.

In the system described in the above-mentioned patent, a display is operated by the controller to display successive tape positions determined by the controller following several revolutions of both reels. If such display is updated to show the tape position each such determination, the display may jump 6 to 8 seconds at a time and the jumps may be uneven. In contrast, in the above-referenced patent application, a method is provided for operating such a display so that the display is uniformly and smoothly updated to show changes in tape position. For example, where tape position is displayed in terms of time to the end of the tape, the display is operated to show changes in tape position of one second, the display being operated by a display clock and the rate of the display clock being synchronized with the actual rate of movement of the tape by comparing the actual tape position as determined each cycle with the tape position shown on the display, and changing the rate of the display clock to eliminate any difference between the actual position and the display position over a prolonged interval, to smooth the operation of the display and synchronize it with tape movement.

In employing the present invention different embodiments are more suited to the arrangements of the above-mentioned patent and application due to the differences in calculation and display techniques.

It is an object of the present invention to improve the apparatus and methods illustrated in the above-identified patent and patent application in such a manner that the dangers of improper selection of cassette type are eliminated by means of a reliable arrangement which works automatically as soon as the tape is driven.

A further object of the invention is to provide means for warning the user of the tape transport device of the necessity for a correction before the correction is carried out.

Other objects and advantages of the invention will become apparent upon reading the following detailed description and upon reference to the drawings in which:

While the invention is susceptible to various modifications and alternative forms, certain illustrative embodiments have been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

In particular it should be noted that the apparatus and methods disclosed relate generally to controlling the transfer of a flexible web member from a supply reel to a take up reel. Although not confined thereto, the invention relates more particularly to magnetic tape in a recording playback apparatus, more specifically of the cassette type.

In accomplishing the objects of the present invention, the illustrated apparatus and method is characterized in that as the magnetic tape is travelling, such as for the normal play or record modes, at least two positions of the magnetic tapes are compared with one another, a signal is generated which is representative of this comparison, and this comparison signal is further compared with an interval or a reference value, and the type of cassette which is indicated as having been selected is altered, or not altered, in accordance with the result of this latter comparison. In order to improve the accuracy and to prevent any errors in the correction of the type of cassette, the above described sequence is advantageously repeated several times before proceeding with a correction if this proves necessary. In order to warn the user of the tape device of the necessity for a correction before it is carried out, provision is made for activating a luminous signal, such as a flashing diode, after detection of the error in the selection of the type of cassette, in order to warn the user that the type of cassette selected is not correct and that the latter is being automatically corrected.

In the following description, two illustrative embodiments will be described with reference respectively to the arrangements disclosed in U.S. Pat. No. 4,172,231 and U.S. application Ser. No. 953,211.

In accordance with the methods and apparatus described in this patent and patent application, if a cassette is introduced into the apparatus and a type of tape cassette has been selected, the microprocessor in the control unit for the tape device computes the position of the tape along its course of mvement. The calculations are made when the supply and take up reels have both supplied a given number of pulses, and a calculation result is transmitted to a digital display and brought to the attention of the user.

In a first embodiment of the invention, relating more particularly to the above-mentioned U.S. Pat. No. 4,172,231, and with reference to FIGS. 4 and 4A herein, successive calculations of tape positions are made and utilized to determine if correction of a tape cassette type indication is necessary.

In carrying out the microprocessor program of this embodiment, a verifying counter in the processor is utilized, and tape position calculations are obtained from the DETERMINE time or position element numbered 54 in the referenced patent. Similarly, cassette type indications are made through the cassette keys and internal and cassette constants are stored in processor memory. Further, a warning indicating diode must be added to the apparatus of the patent, under the control of the processor.

Figure 4:
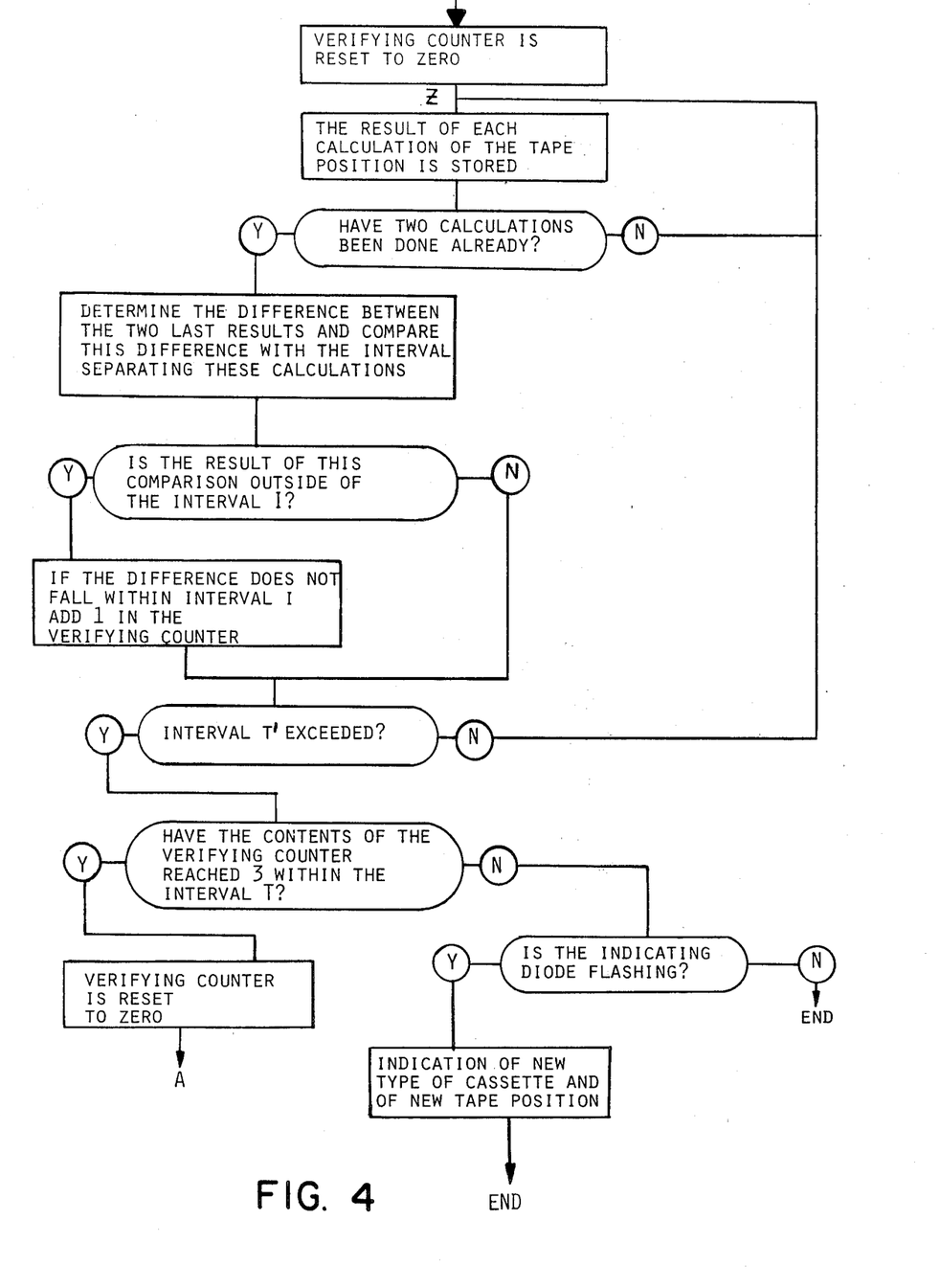
FIGS. 4 and 4A are a flow chart of the processor program in accordance with an embodiment of the invention.
Figure 4A:
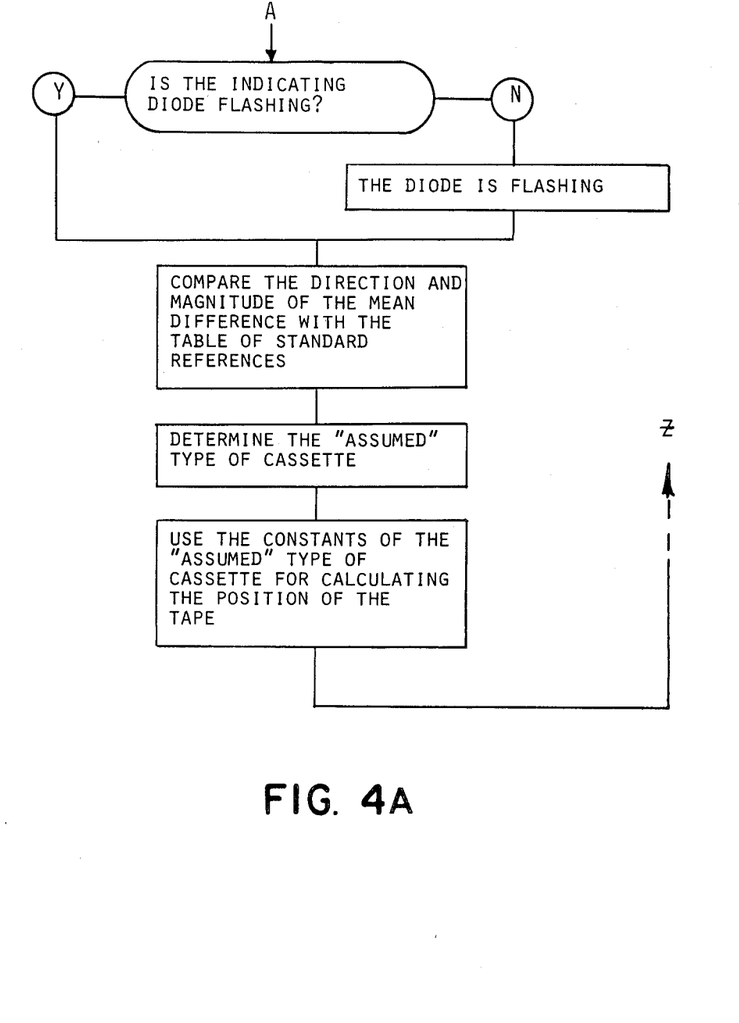

Referring now to the flow chart of FIGS. 4 and 4A, a sequence of operation for the microprocessor is illustrated. After the verifying counter, as shall be discussed in more detail hereinafter, has been reset to zero, the results of each calculation of the tape position are stored. After that two calculations have been performed, the most recent calculation of tape position is compared with that just previously obtained and the microprocessor determines the difference between these two results. This difference is then compared with the interval of time separating the two calculations, which may be measured advantageously with the aid of a clock contained in the microprocessor. If the difference between the tape positions does not fall within a reference interval "I" stored in the microprocessor, a verifying counter, previously reset to zero, has its contents incremented by one unit. The use of an interval "I" permits some deviation for a cassette from the statistical average without incrementing the verifying counter.

Once the value in the counter reaches three in a given interval T', which means, for example, that on three rechecks a difference has been measured which does not fall within the reference interval "I" stored, the microprocessor causes a diode to flash in order to alert the user to the fact that the selected type of cassette is incorrect.

Simultaneously, the direction and magnitude of the means of these differences are determined and the microprocessor selects another type of cassette by comparing these with a table of standard reference values stored in memory. If memory capacity is insufficient to store the reference tables, provision is made to try successively all of the different types of cassettes until the results of the successive comparisons remain within the given reference interval "I" indicating the type of cassette in the apparatus has been correctly identified and can now be "assumed". The constants of this "assumed" type of cassette are then called up from the "cassette constants" memory and used for the calculations of the tape position.

With the aid of these new constants the microprocessor continues to compare the difference between two successive calculations of the tape position with the interval separating these calculations. If the results of these comparisons remain within the reference interval "I" over three successive calculations it means that the new constants are in good agreement with the cassette used and the indexing of the type of cassettes, done with the aid of light-emitting diodes is corrected correspondingly. Simultaneously, the exact position of the tape is indicated and the warning diode is switched off.

If, on the other hand, the results of these comparisons do not fall within the reference interval "I" new constants corresponding to an "assumed" type of cassette are called up from the memory and the process continues until the correct constants corresponding to the type of cassette used are selected.

In accordance with a second embodiment of the invention, relating more particularly to U.S. application Ser. No. 953,211, a clock controlling the indicating device is used directly. Before describing the operation of the microprocessor in regard to this embodiment, reference is made to FIGS. 1 and 2 which illustrate the associated control arrangement.

Figure 1:
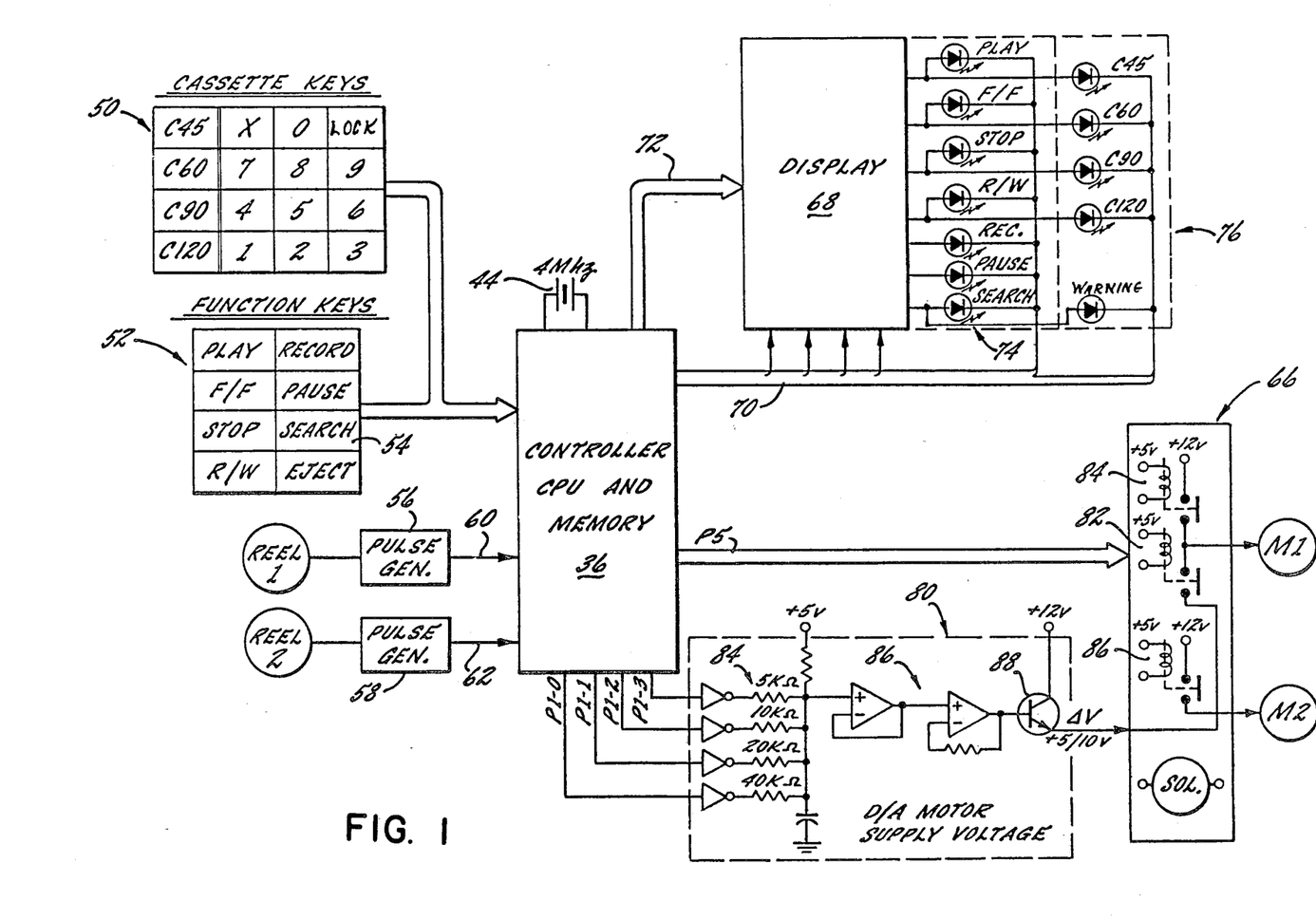
FIG. 1 is a block diagram of a tape transport apparatus including a controller of the apparatus in accordance with the present invention.
Figure 2:
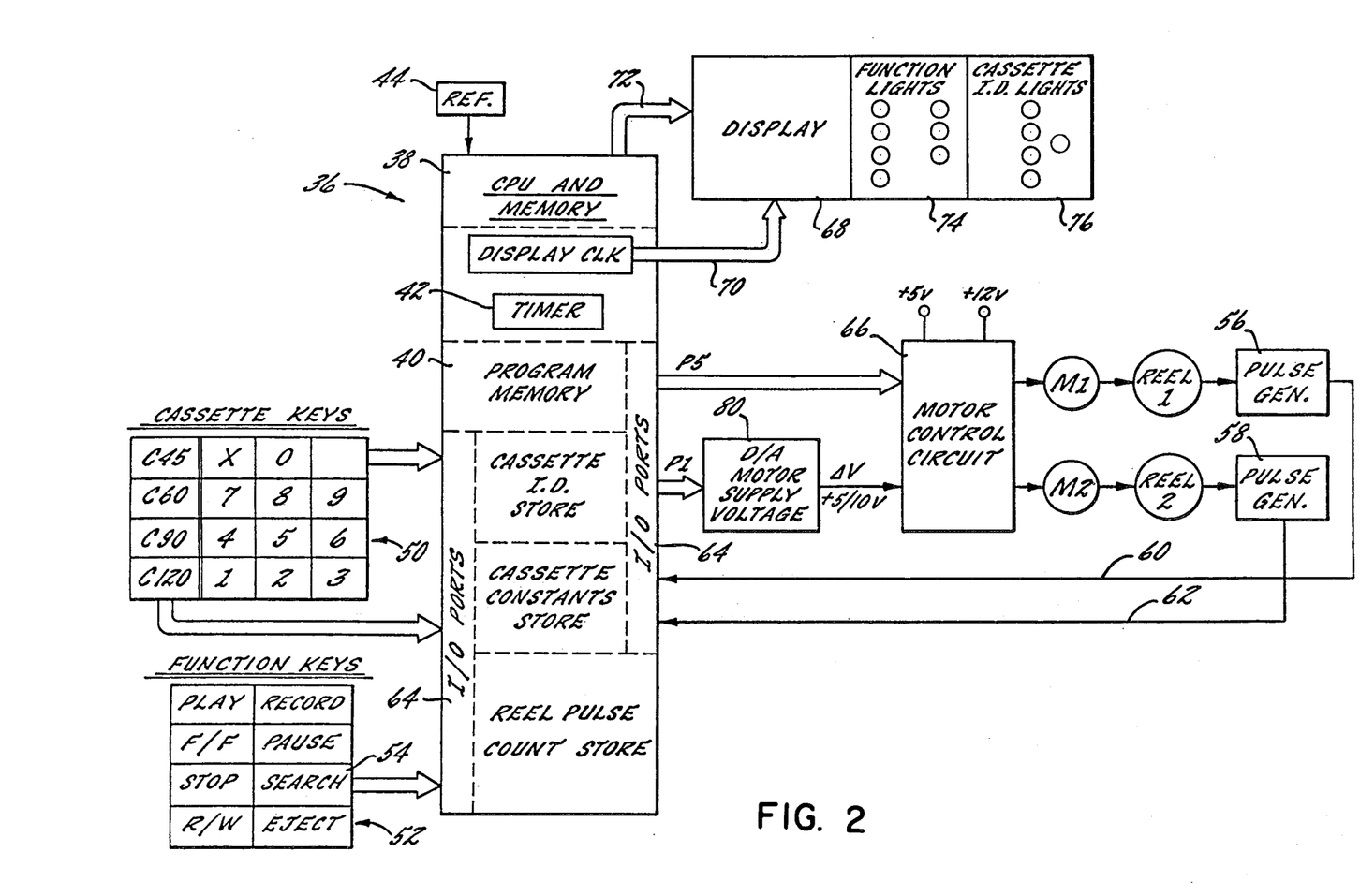
FIG. 2 is a block diagram similar to that of FIG. 1, detailing the memory sections of the controller and diagrammatically illustrating the controller output to the display and motor control circuit for the reel drive motors of the tape transport apparatus.

FIGS. 1 and 2 are block diagrams of tape transport apparatus having a control system constructed in accordance with the present invention and utilizing the methods of the present invention. The system, in general, includes a controller 36, a motor control circuit for the drive motors of the tape transport apparatus, a display for monitoring tape movement by visually displaying tape position, an operator panel with a key board and control switches, and reel speed dectectors herein shown as pulse generators supplying information on reel speed to the controller 36. In the preferred form of the invention the controller 36 is comprised of a set of integrated circuit chips forming a microprocessor, an exemplary and preferred microprocessor being the Mostek F8 which includes a CPU unit 38 and one or more ROM memory units 40. As indicated in FIG. 2, the controller 36 includes a timer 42, which in the case of the Mostek F8 microprocessor is provided by the memory unit 40, and has an external reference frequency input 44 which provides a time base so that the timer is operable in real time.

While it is preferred to utilize a Mostek F8 family of chips to provide a microprocessor based controller 36, it will be appreciated that other microprocessors are available and may be used to serve the same functions, and that the controller may be implemented using other equivalent electronic devices. When implemented with the Mostek F8 chips, the F8 CPU provides 64 bytes of RAM that may serve various register functions unique to the present invention, as well as provide read/write memory for arithmetic and logic functions. The CPU among other circuits also includes an arithmetic logic unit, an accumulator, I/O ports, clock circuits, and interrupt logic which allows CPU operation to be interrupted by a timer on the ROM chip or by an external source. One or more F8 ROM chips provide for storage of programs, I/O ports, a timer and program counter and stack register which handle the program function. With this construction, direct interfaces can be made by the controller 36 with peripheral devices since the CPU circuits provide, for example, encoding and decoding circuits for operating a display. The ROM's also provide for storage in coded signal form of the various unique constants required for cassette identification, search for target positions and other tape control functions performed by the apparatus, labeled in FIG. 2 as memory sections or blocks Cassette I.D. Store, Cassette Constants Store and Reel Pulse Count Store.

Operator activated inputs to the controller 36 are provided from an operator panel having one keyboard for digit keys 0-9 and cassette keys 50 labeled C-45, C-60, C-90 and C-120, and a second keyboard with function keys 52 labeled play, record, stop, etc. which also includes the search mode key 54.

Apparatus activated inputs to the controller 36 include detectors of speed of the reels of the cassettes or open web/reel assemblies in the tape transport apparatus, herein shown as including pulse generators 56, 58 on the spindles for reel 1, reel 2 respectively. Preferably the pulse generators 56, 58 are constructed to provide pulses at a rate representing reel angular velocity or rotational speed, and eight pulses per revolution of each reel is preferred for the rate, although the rate of pulse generation may, of course, be varied, and the speed detectors may, if desired, take other forms. Pulse streams or "reel pulses" from the pulse generators 56, 58 representing the rotational speed of the reels are supplied over input lines 60, 62 to the input/output ports 64 of the controller 36.

The tape transport apparatus includes drive motors M1 and M2 for the reels of the cassette or web/reel assembly which are controlled by a motor control circuit 66, which in turn is controlled by the controller 36.

The system provides for operation of the display 68 by the controller 36 over output lines 70 and 72 which, in the preferred form of the invention, serve to drive the display to show in terms of time the position of the tape in the tape transport apparatus. Illustratively the display will be in minutes and seconds, the display having 4 digits, a higher order and lower order digit for the minutes and a higher order and a lower order digit for the seconds. Associated with the display are a set of lights 74 which are energized to indicate the functions being carried out by the apparatus under direction of the controller 36, such as play, fast forward, search, etc. Another set of lights 76 is used to display the type of cassette in the apparatus, those lights being labeled C-45, C-60, C-90, C-120 and WARNING. The function lights and cassette lights 74, 76 are driven from output lines 70 and through connections including the CPU circuits from the cassette keys 50 and function keys 52, so that manual activation of one of those keys also results in energizing the corresponding function or cassette light. The WARNING light is activated as shall be described hereinafter.

In somewhat more detail, the display 68 is operated by a dispaly clock which is preferably served by a register of the CPU 38 of the controller 36, the display clock operating to update the display in synchronism with the movement of the tape as tape is moved from one reel to the other of a cassette or web/reel assembly.

The motor control circuit 66 is supplied with output signals from the input/output ports 64 of the controller and also with a variable supply voltage V between five to ten volts which is connected to the take-up reel drive motor M1 via operation of a relay in the motor control circuit 66. The variable supply voltage is produced by the controller 36 in accordance with the tape position by placing a digital representation of the calculated supply voltage on a set of four output lines labeled P1-0 through P1-3 which represent connections to input/output ports 64 of the controller 36. A circuit 80 schematically shown in FIG. 1 converts the representation of calculated supply voltage on combinations of the output lines P1-0 through P1-3 to the supply voltage for the take-up drive motor and thus serves as a type of digital to analog converter circuit to produce the desired variable motor supply voltage.

Preferably, in carrying out the various aspects of the present invention, programs for controlling the processor 38 are stored in the program memory section of the controller 36 as indicated in FIG. 2. It should be recognized that while it is preferred to perform the methods and implement the apparatus of this invention by a microprocessor under program control, the invention is not so limited and may be implemented by analogue circuits or discrete digital circuitry.

It is preferred to operate the CPU 38 of the controller 36 under program control to determine the absolute value of tape position in terms of time to the end of the tape on the takeoff reel. Such a position determination will be displayed by minutes and seconds on the display 68. Tape position determination is made by calculations following position determination algorithms employing equation III' which, it will be recalled, requires the ratio of rotational speeds of the reels and numerical constants $A''$, $B''$ uniquely characterizing the physical parameters of the particular type of cassette or web/reel assembly loaded in the tape transport apparatus. In keeping with the present invention and as disclosed in the prior patent application, numerical constants for the different known types of cassettes illustratively C-45, C-60, C-90 and C-120 are stored in a "Cassette Constants Store" provided by the memory unit 40 of the controller 36. Such numerical constants $A''$, $B''$ are recalled from memory in the course of operation of the CPU under program control to carry out the position determination algorithms. The ratio of rotational speeds of the reels is measured from the pulse streams received from the pulse generators and representing the rotational speeds of the reels 1 and 2. In the prior application the period is timed for a predetermined number of revolutions of both reels, and the speed ratio based on the ratio of measured times is measured.

Figure 3:
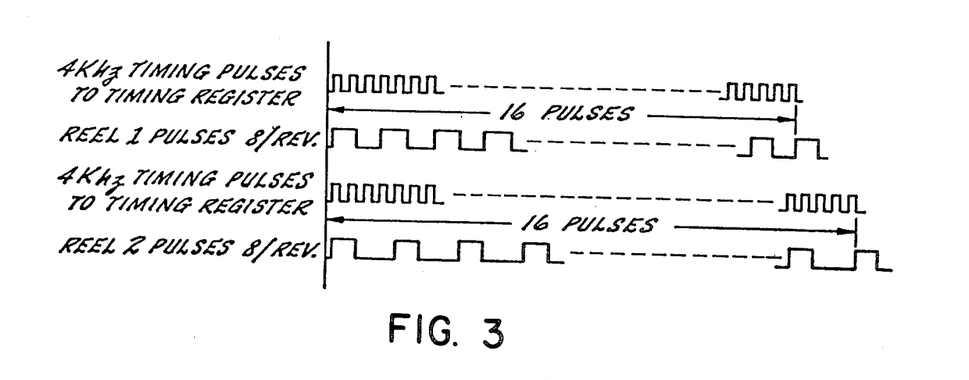
FIG. 3 is a timing diagram illustrating the timing of two reel revolutions by means of timing pulses for an elapsed period represented by sixteen reel pulses.

Means for measuring actual time is provided by the timer 42 of the controller 36. With the pulse generators 56, 58 providing eight pulses per revolution, 16 pulses from either pulse generator represents two complete revolutions of a reel. As shown in FIG. 3, 16 reel pulses are timed by accumulating high frequency pulses in a timing register which may be provided by one of the scratch pad registers of the CPU or by memory included in the controller 36. The high frequency pulses accumulated in the timing register represent the elapsed time $T_1$ for two revolutions of reel 1. Similarly, the elapsed time $T_2$ is measured off for two revolutions of reel 2. The ratio te elapsed time $T_2/T_1$ is calculated by division, such as by dividing the content of one timing register by the content of the other timing register to provide an equivalent reel speed ratio to the ratio $P_2/P_1$ derived by calculating the ratio of accumulated reel pulses as explained in the prior patent application.

Referring to equation III' as hereinbefore set forth, it will be seen that to make a calculation for $t_2$ requires constant $A''$ and $B''$ plus the ratio of $P_2/P_1$. To calculate $t_2$ by the CPU under program control requires straightforward programming. The measured ratio of rotational speeds of the reels, based on the ratio of times $T_2$ divided by $T_1$, it will be appreciated serves for the required ratio $P_2/P_1$ in the denominator of the fraction of equation III'.

While FIG. 3 illustrates timing the period of 16 reel pulses, the number may be varied as desired. For example, for determination of speed of the reels when tape is driven at fast speed, the CPU is preferably programmed to time 32 pulses from each reel, representing four revolutions of each reel. It will be recognized that the intermediate portion of tape for which a tape position determination is made, is that portion being transferred from reel to reel while the speed ratio is determined.

Figure 5:
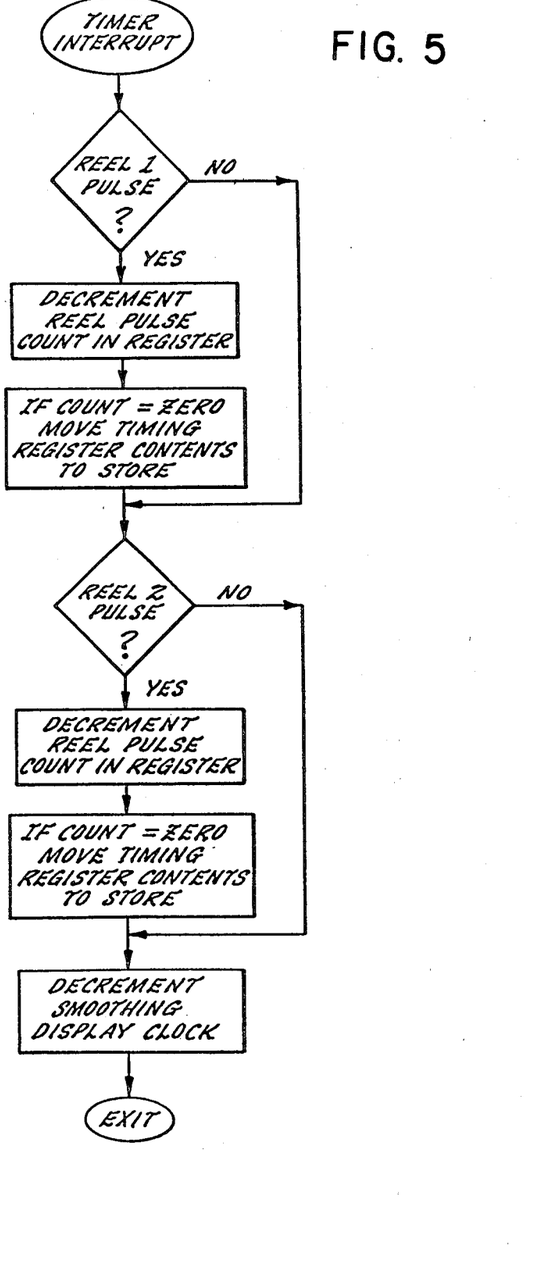
FIG. 5 is a simplified flow diagram of a subroutine executed by the CPU in response to an internal interrupt initiated by the timer of the controller.

Referring to FIG. 5, this simplified flow diagram illustrates the program routine followed by the CPU in response to a timer interrupt request from the timer on the ROM. The timer interrupt request may be initiated at any preselected time interval such as the time base clock frequency of 4 KHz or one-quarter millisecond. As shown in FIG. 5, the input lines from the pulse generators are tested and as pulses appear on one or the other of the input lines, registers for each reel which are initially set to a count of 16 are decremented until zeroed. Pulses at a rate determined by an internal master clock are clocked into an accumulated in a timing register for each reel, for the period of 16 pulses. When the count reaches zero, after 16 pulses have been received from the associated reel pulse generator, accumulated clock pulses for the 16 reel pulses are moved from the timing register to another register and stored, the content of that register then representing the actual or real time for 16 pulses. A speed ratio determination is made by dividing the content of one register with the content of the other register, producing a speed ratio for use in the tape position determination equation III".

In the system of the commonly assigned prior patent previously referred to, the controller updates the display of tape position based on periodic determinations of instantaneous positions of the tape. Considering the system constructed as preferred, in which tape position is displayed in terms of time to the end of the tape, if the tape position determination is repeated approximately every 6–8 seconds representing the rotation through two revolutions of both reels where both reels are half full of tape, if the display is updated to show the tape position after each cycle of determination the display will jump 6–8 seconds at a time, and the jumps may be somewhat uneven.

In the above-mentioned application, a method and means are provided for operating the display so that it is uniformly and smoothly updated to show changes in tape position of one second, the display being operated by a display clock in the intervals between tape position determinations, and the rate of the display clock being synchronized with the actual rate of movement of the tape by comparing the calculated tape position as determined each cycle, with the tape position shown on the display, and changing the rate of the display clock to eliminate any difference between the actual calculated position and the display position over a prolonged interval, to smooth out the operation of the display.

Figure 6:
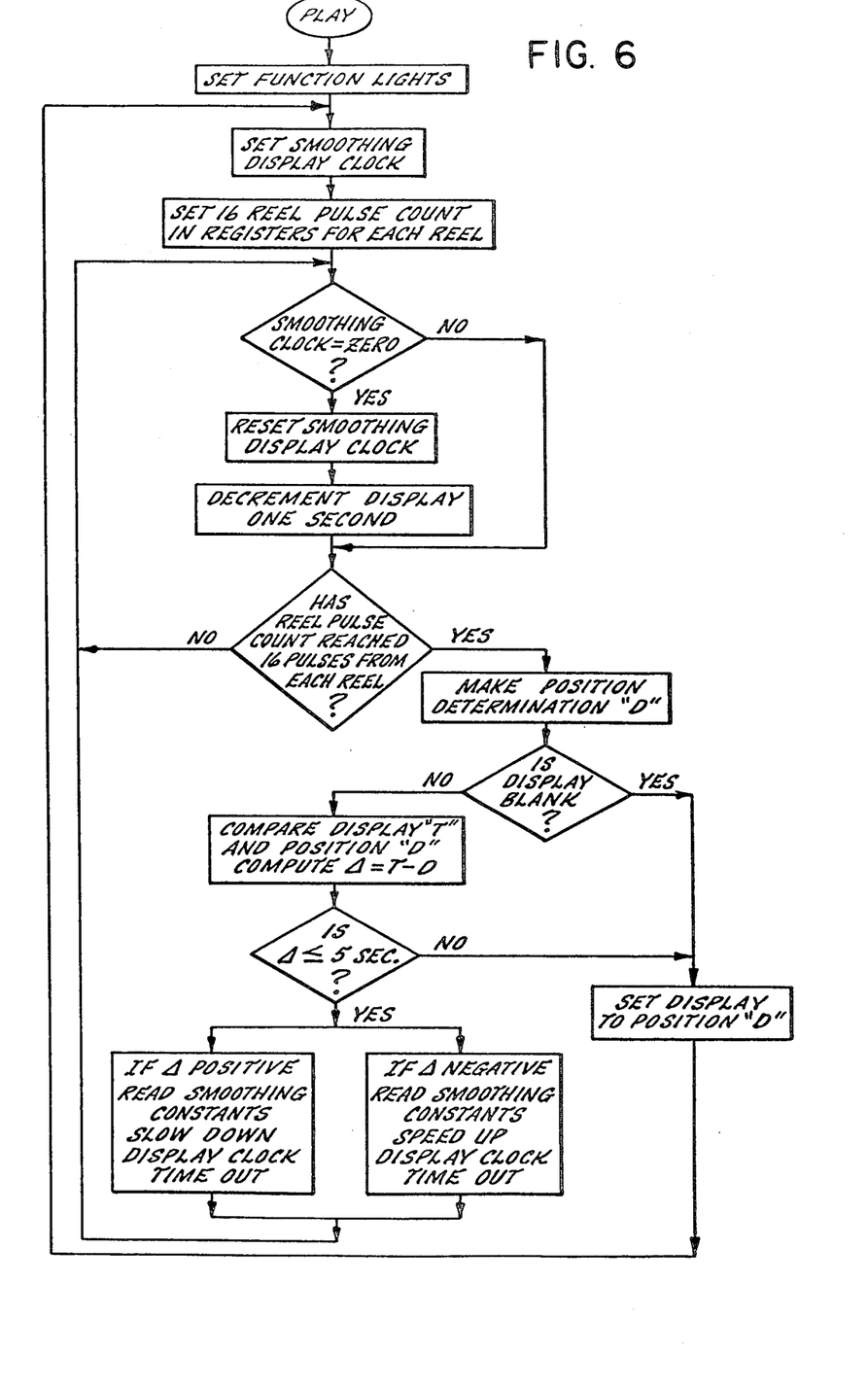
FIG. 6 is a simplified flow diagram of a display subroutine.

An illustrative simplified program flow chart (FIG. 6) illustrates the programmed operation of the CPU 38 to drive the display 68 in this manner, it being understood that a program will be stored in the program section of the memory unit 40 to operate the CPU 38, as will be clear to a man skilled in this art. Turning first to FIG. 1, to drive the display 68 combinations of output signals on the output line 70, 72 from I/O port 64 are connected to the circuits of the display 50 which may be an LCD or LED display unit of four digits to display minutes and seconds. The CPU 38 and memory 40 may provide the requisite decoder circuits to drive the display directly when Mostek F8 integrated circuits are used, or decoder circuits separate from the controller 36 may be provided where the controller is implemented in a different manner. Preferably, and in keeping with this invention, the CPU 38 under program control provides a display clock 78 which is connected to and controls the display 68.

Figure 7:
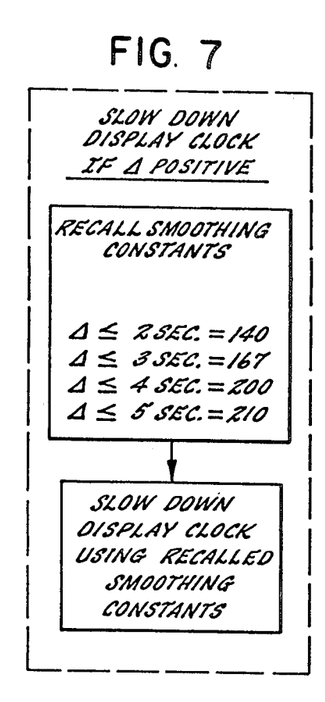
FIGS. 7 and 7A are simplified charts of program steps shown in FIG. 6.
Figure 7A:
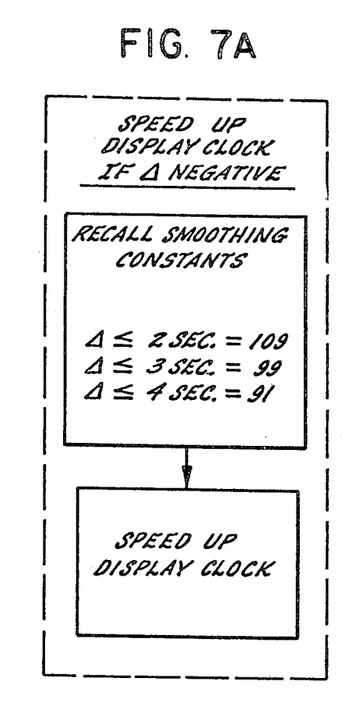

Referring to FIG. 5, as there shown the main programmed operation of the CPU 38 is interrupted on a regular real time cycle by a timer interrupt request. The display clock 78 may be implemented by a register of the CPU 38 or RAM memory of the memory unit 40, which register is initially set to a value or content, and is decremented each cycle of the timer interrupt request, for example every 8 ms., so that in the absence of adjustment the register times out each second and the display clock updates the display once each second. The nominal value loaded in the register is 125, 125 counts of 8 ms. giving one second decrementation. Due to time interrupts and other time consuming operations, the central value is 122 not 125. The time out of the display clock register, and thus the rate at which the display clock updates the display, is speeded up or slowed down, by loading the display clock register with a value greater or less than the central value by an amount which varies according to the sense and magnitude of the difference between the position shown on the display clock and the actual position of the tape as determined each cycle by the controller. The value loaded in the register is read from memory as indicated in FIGS. 7 and 7A, the display clock being adjusted as the difference ($\Delta$) between the display position "T" and the actual position "D" varies within a limit plus or minus 5 seconds. As indicated in FIG. 7, the display clock is slowed down if $\Delta$ is greater than zero (within the 5 seconds), the calculation for the digital value to be added to the content of the register being based on smoothing constants that are indicated in FIGS. 7 and 7A. Thus if $\Delta$ is plus or minus less than 1 second, the constants value is 122, representing a median value for basing the calculation to adjust the time out of the display clock register. As indicated, the constants value increases and decreases incrementally. If $\Delta$ is less than zero the value of the constants read from memory are from 122 to 91; as shown in FIG. 7 if $\Delta$ is greater than zero the constants read from memory are from 140 to 210.

Again referring to FIG. 6, in somewhat more detail, in response to operator initiation of the play function, the system enters the play mode of operation the function lights are set by the controllers 30, 36, and as indicated in the block "Set Smoothing Display Clock" an initial value is set into the register serving the function of the display clock. The display clock register is therefore set to a content such that it will clock the display to update the display on a one second interval. As indicated in the next block in the flow chart, a 16 reel pulse count is set in registers for each reel. This is to initialize the circuits for timing the period of two revolutions of each reel. For this purpose, the stream of reel pulses issued from each reel pulse generator is counted until a total of 16 pulses, representing two revolutions of the associated reel, has been received.

Turning back to FIG. 6, following the step of "Set 16 Reel Pulse Count in Registers for Each Reel" as there indicated the question is asked "Smoothing Clock Equals Zero?". As also indicated in the timer interrupt flow chart of FIG. 5, the smoothing display clock is decremented each timer interrupt cycle, and if the smoothing display clock has been decremented to zero, as indicated in the flow chart in FIG. 6, the smoothing display clock is reset and the display is decremented 1 second. If the smoothing clock does not equal zero, the routine jumps from "Smoothing Clock Equals Zero?" to the block "Has Reel Pulse Count Reached 16 Pulses from Each Reel?", representing that both registers for the reels have been decremented to zero and the time is ready to make position determination "D". If the display is blank, as it may be where this is the first position determination made by the controller, then the display is set to position "D"; if the display shows a position made by a prior determination, the position shown in the display "T" and the position "D" just made are compared, and the value of "$=T-D$" is computed. If the difference between the displayed position "T" and the just determined position "D" is within $\pm 5$ seconds, then an adjustment is made of the display clock rate. If the difference between the displayed and determined position is greater than 5 seconds, the display is updated to show the newly determined position "D". Thus, smoothing of the display operation by adjusting the rate of the display clock, is only carried out when the comparison between the displayed position and the newly determined position is within a 5 second interval. Said smoothing is made over a prolonged interval which is on the order of 15 seconds, the digital value to be added to the content of the display clock register being calculated to change the rate of the display clock in a smooth manner so as to avoid any abrupt and noticeable increase or decrease in the normally one second changes in position shown on the display.

Figure 8:
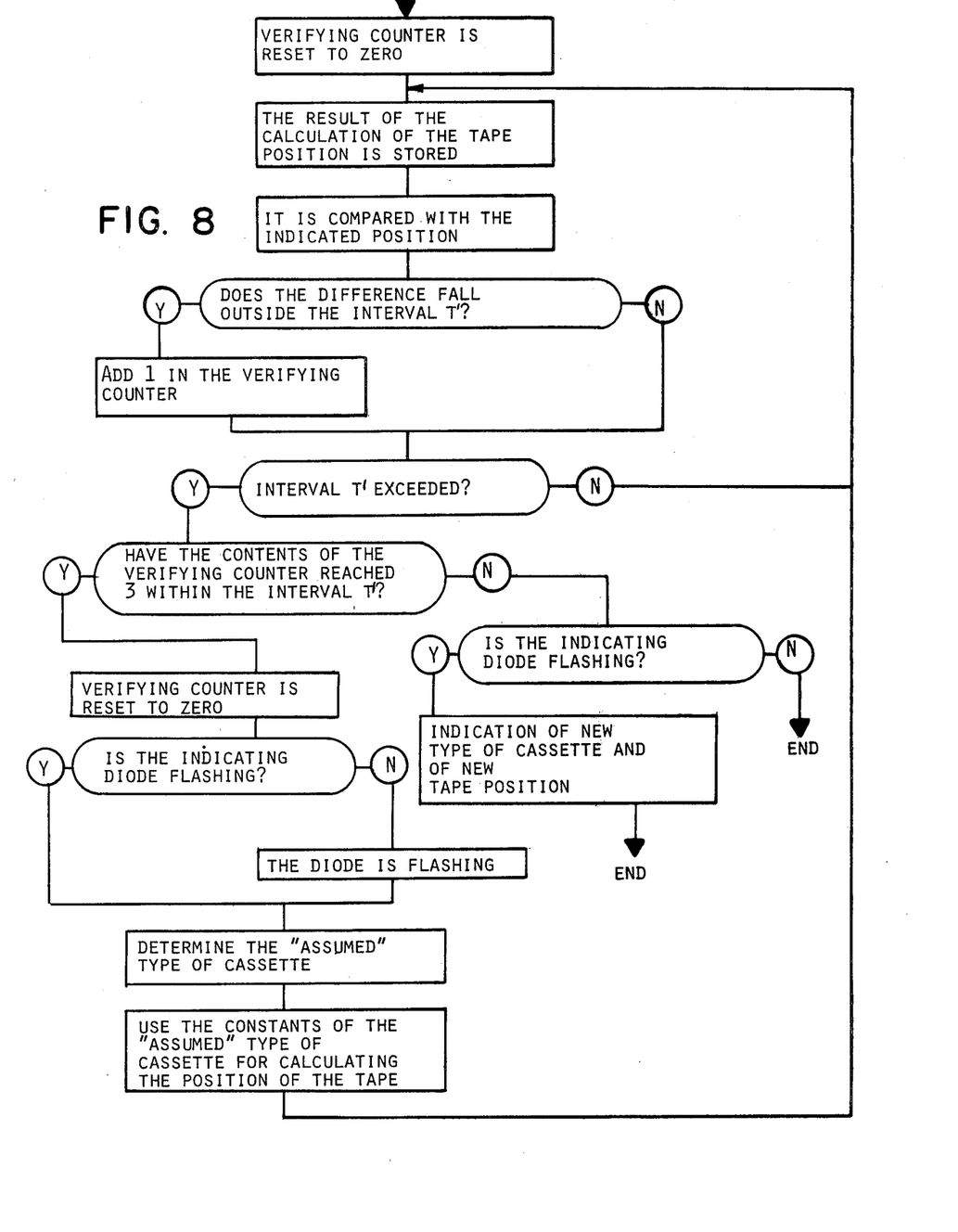
FIG. 8 is a simplified flow diagram of a processor program according to another embodiment of the present invention.

In the arrangement described in the above mentioned commonly assigned patent application an electronic system is described which allows control of the display in such a manner that the updating of the tape position is done at every unit of time (each second) and the indicating rhythm is controlled by a clock in such a manner that it can be speeded up or slowed down in accordance with the direction and the magnitude of any difference which occurs between the indicated position and the position calculated by the microprocessor. In this case, the direction and magnitude of the difference ($\Delta = T - D$) between this calculated position D and the indicated position T are stored at each calculation of the tape position as outlined in the flow chart of FIG. 8.

The difference $\Delta$ between the calculated position and the indicated position is then compared to a reference interval T' and, if the difference $\Delta$ falls outside of this interval, a verifying counter, previously reset to zero, has its contents incremented by one unit. This verifying counter is advantageously selected from the counters and registers available in the microprocessor. From then on, the device operates in similar fashion to that described in regard to FIGS. 4 and 4A. Therefore the operation will not be further described in detail.

In a preferred implementation the interval T' used for the verifying counter corresponds to the time which is required by the microprocessor for performing at least three successive calculations of the tape position. However, any other method of measuring the interval T' can be used without deviating from the intent of the invention. As previously noted, a microprocessor is used in which, due to a lack of capacity, the reference tables cannot be stored (which reference tables—see FIG. 4A— make it possible to "estimate" the type of cassette used by virtue of the result of comparisons with the reference interval), provision is made for the device described previously to try successively all of the different types of cassette. For example, successively C-60, C-90, C-120 (if C-45 has been selected) will be tried until the results of the successive comparisons remain within the given reference interval. Should the successive comparisons indicate the type of cassette is correctly identified, for example, when using the constants corresponding to the type C-90, the display of the type of cassette is modified to show the correct type, the exact position of the magnetic tape is indicated and, simultaneously, the flashing diode is disabled.

Figure 9:
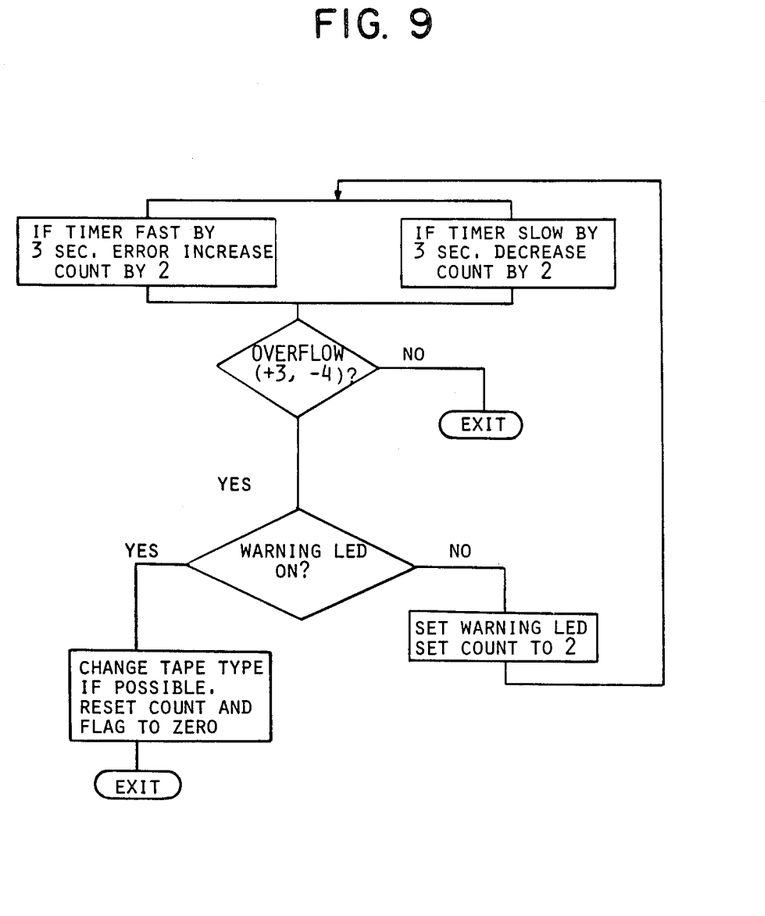
FIG. 9 is a modified flow diagram similar to that of FIG. 8.

An alternative cassette type indication correction method is illustrated in the flow chart of FIG. 9. As shown therein the microprocessor utilizes the clock driving the display in accordance with the flow chart. The timer corresponds to the "$\Delta = T - D$" as computed in the flow chart of FIG. 6. When the tape is being driven at PLAY speed, the rate of the smoothing clock is periodically checked. Each time the display is fast or slow by an amount of three seconds, the number 2 is respectively added to or subtracted from the contents of a special register, internal to the processor, initially reset to zero at the beginning of PLAY. When the contents of this special register exceed $+3$ or $-4$, the warning LED is switched on. Also, a flag is set and 2 is loaded in the register. Then, another checking sequence is performed and, should the special register overflow, the tape cassette type is changed, if possible, while the register and flag are reset to zero.

Provision is made for the automatic correcting of the type of cassette not to become operative until the tape has been driven for a certain length after the cassette has been introduced at the start of the tape. Since the materials used to attach the magnetic tape to the reels have variable and different thicknesses from those of the magnetic tapes, they can falsify the calculations of tape position and thus having erratic effect on the calculations used during the automatic correction.

The limit number of the verifying counter, fixed at 3 in the description, can take any other value, according to the interval T. Rather than causing a diode to flash as an indicating signal, the indicating device displaying the tape position might advantageously be made to flash. Various modifications may be made by one of skill in the art to the method, described above in exemplary form, without departing from the intent and scope of the invention.

As it may happen that the user introduces into the apparatus a cassette of a non-standard type (cassette used for the recording or the reproduction of messages, etc.) there is provided in the apparatus a control called "LOCK" which when engaged, cancels the automatic correction device so that the type of cassette selected by the user will not be changed during the travelling of the tape.

What is claimed is:

1. A method for correcting automatically for the type of cassette introduced into a device having means for transferring a tape between two reels contained in the cassette, comprising the steps of:
   measuring the rotational speeds of the supply reel and of the take-up reel;
   establishing the ratio of these measurements independently of the speed and the direction of movement of the tape;
   storing reference data representing the characteristics of different types of reels and tapes in the device;
   releasing the reference data corresponding to one selected type of reel and tape;
   generating intermediate signals representing the said ratio;
   processing these intermediate signals and the reference data released and producing output signals representing the instantaneous position of the tape with respect to one of its ends for said selected type of reel and tape, said method including the further steps of:
   comparing at least two positions of the tape with one another;
   generating a difference signal which is representative of this comparison;
   comparing this difference signal for correspondence with a reference value; and
   correcting the selection of the type of cassette if required by lack of correspondence in accordance with the result of this latter comparison.

2. The method according to claim 1, in which the processing step produces output signals representing calculated tape positions, and the step of comparing at least two tape positions is carried out by processing said output signals and deriving the difference between two calculated tape positions and comparing this difference with the interval separating these two calculated tape positions.

3. The method according to claim 1, in which the processing step produces output signals representing corresponding indicated and calculated tape positions and said indicated tape positions are shown on a display, and the step of comparing at least two tape positions is carried out by deriving the difference between a calculated tape position and the corresponding indicated tape position shown by the display at the moment the calculated tape position is obtained.

4. The method according to any one of the claims 1 through 3, including verifying the selection of the type of cassette with a counter which during a given interval (T') counts up the number of times the difference signal generated by comparing tape positions does not fall within said stored reference value.

5. The method according to claim 4, in which the verifying counter enables a luminuous or audible indicating signal device when its contents exceed a predetermined stored value.

6. The method according to claim 5, in which simultaneously with the enabling of the indicating signal device, the direction and magnitude of the mean difference from the reference value are determined, in that this direction and this magnitude are compared with a stored reference table, and that an "assumed" type of cassette is determined in accordance with the result of this comparison.

7. The method according to claim 6 in which the constants of the "assumed" type of cassette are used in the processing step to produce output signals representing calculated tape positions in order to verify this "assumed" type of cassette.

8. The method according to claim 4, in which the interval (T') controlling the verifying counter corresponds to a given number of calculated positions of the tape obtained by processing intermediate signals and reference data.

9. The method according to any one of the claims 1 through 3, in which the method of correcting for the type of cassette does not start until the tape has unwound for a certain length after the cassette has been introduced at the start of the tape.

10. A method for correcting automatically for the type of tape cassette introduced into a device having means for transferring a tape at known speed between two reels contained in the tape cassette, comprising the steps of:
(a) deriving a value for a change in tape position from changes in reel rotational speed utilizing constants associated with a particular cassette type;
(b) comparing a theoretical interval corresponding to this position change with a measured interval based upon said known tape speed to obtain a difference value; and
(c) selecting a different assumed cassette type having different associated constants in response to obtaining a difference value exceeding a selected amount.

11. The method of claim 10 which includes, after the step (c), the additional step of:

(d) repeating the steps (a) through (c) after the selection of a different assumed tape cassette type.

12. The method of claim 11 which further comprises, after the step (b), the additional step of:
(b1) repeating the steps (a) and (b) at least once and proceeding to the step (c) only if a difference is obtained on each repeat of the steps (a) and (b).

13. A method for correcting automatically for the type of tape cassette introduced into a device having means for transferring a tape at known speed between two reels contained in the device, comprising the steps of:
(a) determining a series of instantaneous tape positions from a series of ratios of tape reel speed using a formula including constants relating to a particular type of tape carrier;
(b) comparing a measured interval between each of said positions based upon said known speed with a theoretical interval corresponding to the change in tape position to determine a difference value; and
(c) selecting a different assumed tape carrier type and its associated constants in response to obtaining a difference value exceeding a selected amount.

14. The method of claim 13 which includes, after the step (c), the additional step of:
(d) repeating the steps (a) through (c) after the selection of a different assumed tape carrier type.

15. The method of claim 14 which further comprises, after the step (b), the additional step of:
(b1) repeating the steps (a) and (b) at least once and proceeding to the step (c) only if a difference is obtained on each repeat of the steps (a) and (b).

16. The method of either of claims 12 or 15 which further comprises, after the step (b1), the additional step of:
(b2) activating a warning indicator that the assumed tape carrier type is erroneous when said difference has been obtained upon each repeat of the steps (a) and (b).

17. A method for correcting automatically for the type of tape cassette introduced into a device having means for transferring a tape between two reels contained in the cassette, comprising the steps of:
(a) moving the tape at known speed from reel to reel,
(b) calculating a series of instantaneous tape positions from a series of ratios of tape reel speed using a formula including constants relating to an assumed type of tape cassette;
(c) providing indicated positions of each in said series based on said known speed;
(d) comparing said calculated tape positions with said indicated positions;
(e) correcting the assumed tape cassette type and its associated constants in response to obtaining a difference value exceeding a given amount from said comparison.

18. A method according to claim 17 wherein step (d) includes comparing the indicated position with the calculated position for successive positions.

19. A method according to claim 17 wherein step (d) includes comparing the interval between successive indicated positions with the interval between successive calculated positions.

20. A method for automatically verifying the type of cassette introduced into an apparatus having means for transferring tape from reel to reel to known speed, comprising:
measuring the rotational velocities of the reels;

storing a group of constants pertinent to various types of cassettes;

determining successive tape positions based upon said rotational velocities and constants from said group of constants which relate to a particular type of cassette;

indicating each said position change based upon said known speed;

comparing an indicated position with a theoretical corresponding determined position to produce a difference value as a result of said comparison; and changing the tape cassette selection and its associated constants if said difference value exceeds a selected amount.

21. Apparatus for transferring at known speed a tape between two reels contained in a cassette which indicates tape position relative to the two reels either in time or in position, and which automatically corrects for the type of cassette introduced into the apparatus in determining this position information, comprising:

means for measuring the rotational velocities of the reels;

means for storing a group of constants pertinent to various types of cassettes;

means for determining successive tape positions based upon said rotational velocities and constants from said group of constants which relate to a particular type of cassette;

a clock for measuring the actual time for each said positions based upon said known speed;

a display operated to indicate said measured times;

means for comparing the indicated time measured by the clock for a position with a theoretical time corresponding to said position to produce a difference value as a result of said comparison; and means for changing the tape cassette selection and its associated constants if said difference value exceeds a selected amount.

* * * * *